(No Model.)

M. C. HAYES.
HARNESS SADDLE.

No. 284,419. Patented Sept. 4, 1883.

Witnesses:
Alfred Fawcett
L. J. White.

Inventor:
Michael C. Hayes,
Per C. C. Shaw,
Atty.

UNITED STATES PATENT OFFICE.

MICHAEL C. HAYES, OF BOSTON, MASSACHUSETTS.

HARNESS-SADDLE.

SPECIFICATION forming part of Letters Patent No. 284,419, dated September 4, 1883.

Application filed June 28, 1883. (No model.)

*To all whom it may concern:*

Be it known that I, MICHAEL C. HAYES, of Boston, in the county of Suffolk, State of Massachusetts, have invented a certain new and useful Improvement in Saddles for Harnesses, of which the following is a description sufficiently full, clear, and exact to enable any person skilled in the art or science to which said invention appertains to make and use the same, reference being had to the accompanying drawings, forming a part of this specification, in which—

Figure 1:
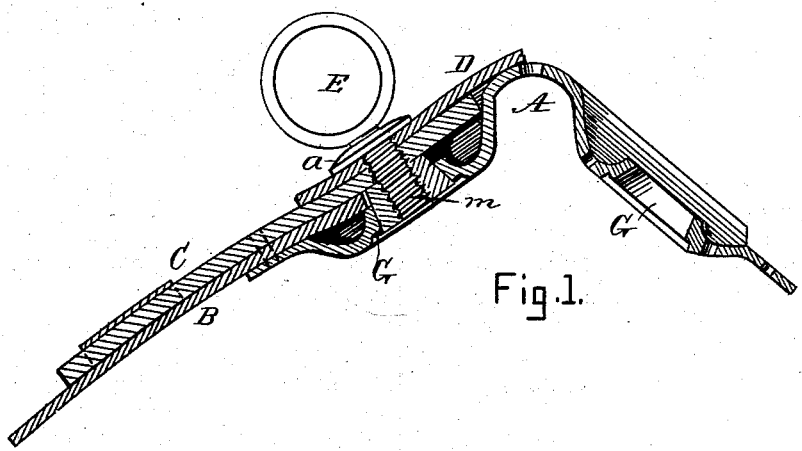
Figure 2:
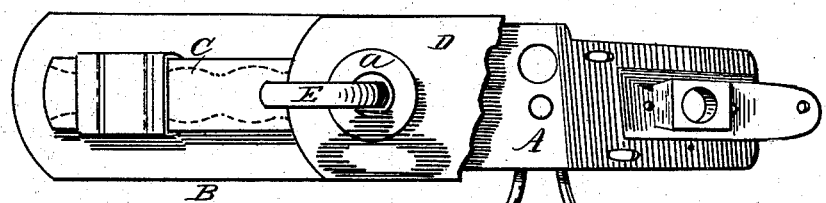

Figure 1 is a vertical longitudinal section of a harness-saddle provided with my improvement; Fig. 2, a top plan view, and Fig. 3 a side elevation of the terret and nut detached.

My invention relates more especially to means for securing the terret of the saddle or preventing it from becoming accidentally loosened or detached; and it consists in a novel construction and arrangement of the parts, as hereinafter more fully set forth and claimed, by which a more effective device of this character is produced than is now in ordinary use.

Figure 3:
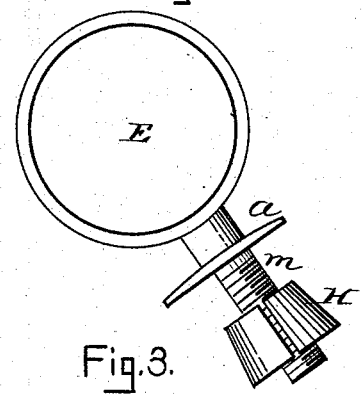

In the drawings, A represents the tree, B the skirt, C the back-band, D the jockey, and E the terret. The terret is provided with an annular flange, $a$, which, when in use, rests upon the jockey D, its body being threaded in the usual manner, as shown at $m$. The tree is provided with two conically-tapered open sockets, G, on both sides of its center, which are largest at their inner ends and designed to receive the nut H. The inner face of the tree is recessed or depressed around the sockets, as shown in Fig. 1, so that the lower end of the nut and terret will be above the lower face of the tree. The nut is conical in form and split or made in two sections, as best seen in Fig. 3, and is inserted in the hole G from the under side of the tree.

In the use of my improvement the two sections of the nut H are first inserted in the hole G. The body $m$ of the terret E is then passed through a hole made in the jockey, back-band, and skirt, and screwed into the nut. As the terret is turned down, the nut will be drawn outwardly and wedged in the tapering hole G, thereby clamping the terret and firmly securing it in position in a manner which will be readily understood without a more explicit description.

Having thus explained my invention, what I claim is—

1. In a harness-saddle, the tree A, having the conically-tapered open sockets G, integral therewith on both sides of the center, in combination with the conically-tapered sectional nuts H, adapted to fit said sockets, the threaded terrets E, provided with flanges $a$, and the parts clamped between said flanges and nuts, substantially as described.

2. In a harness-saddle, the tree A, having the conically-tapered open sockets G, integral therewith, said tree being recessed around said sockets, in combination with the conically-tapered sectional nuts H, adapted to fit said sockets, the threaded terrets E, provided with flanges $a$, and the parts clamped between said flanges and nuts, substantially as described.

MICHAEL C. HAYES.

Witnesses:
C. A. SHAW,
L. J. WHITE.